Figure 1:
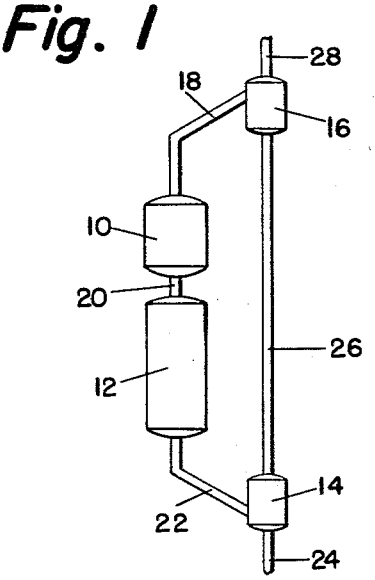

March 16, 1965

W. L. McCLURE 3,173,858

CONTACTING FLUID MATERIAL WITH GRANULAR SOLIDS

Filed March 27, 1961

INVENTOR.
WILLIAM L. MCCLURE

BY Robert D. Spindle

ATTORNEY

3,173,858
CONTACTING FLUID MATERIAL WITH GRANULAR SOLIDS
William L. McClure, Toledo, Ohio, assignor to Sun Oil Company, Philadelphia, Pa., a corporation of New Jersey
Filed Mar. 27, 1961, Ser. No. 98,468
5 Claims. (Cl. 208—148)

This invention relates to processes wherein granular solid contact material is passed downwardly by gravity as a compact bed, and is contacted with a fluid material, e.g., a liquid or gaseous hydrocarbon, to bring about conversion of the fluid material, catalyzed or otherwise promoted by the solid contact material.

The invention is particularly beneficial as applied to processes for catalytic cracking of petroleum hydrocarbons by contact with granular solid cracking catalyst. In such processes, temperatures in the order of 900° F. to 950° F. are commonly employed, and the catalyst, after contact with the hydrocarbons at the conversion temperature, is separated from the conversion products, purged with steam, and introduced into a regeneration vessel, wherein it is contacted with oxygen-containing gas to burn carbonaceous deposits which accumulate on the catalyst during the conversion process.

It is difficult in processes of the type considered here to obtain uniform deposition of carbonaceous material on the catalyst during the conversion process. Therefore it frequently happens that catalyst in certain portions of the cross section of the apparatus has more carbonaceous deposit on it than catalyst in other portions of the cross section. This results in uneven temperature distribution over the cross section of the regenerator when the catalyst is subsequently contacted with oxygen in order to burn the deposits, higher temperatures being developed in those portions of the catalyst where the carbonaceous deposit accumulation is greater. This results in undesirable effects as well known in the art.

The present invention provides a manner of overcoming these disadvantages of prior art operation. The beneficial results according to the invention are obtained by providing, within the catalyst circulating system, a zone wherein the catalyst is suspended in a fluid material, and passed upwardly or laterally or both in a state of agitation and intimate contact with the fluid material. This results in a redistribution of the catalyst over the cross section of the apparatus and provides greater uniformity of the catalyst with respect to carbon content or temperature or both.

The suspension and redistribution of the catalyst can be performed at various locations within the catalyst circulation system. In one embodiment, the suspension and redistribution are performed in the conversion zone, employing the hydrocarbon reactants as the suspending medium. In another embodiment, the suspension and redistribution are performed in a purging zone between the conversion zone and the regeneration zone, the fluid purging medium being employed as the suspending medium. In still another embodiment, the suspension and redistribution are performed in the regeneration zone, the oxygen-containing gas being employed as the suspending medium.

The invention will be more particularly described in connection with the latter embodiment. It is to be understood that the invention is also applicable to the other embodiments, in a manner which will be apparent to the person skilled in the art in the light of the present disclosure.

Figure 2:
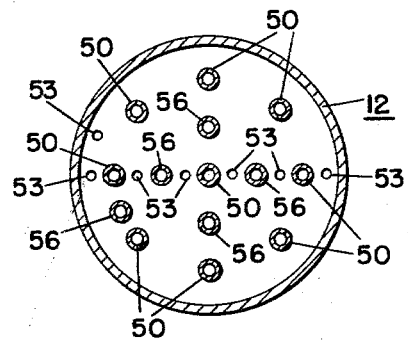
Figure 3:
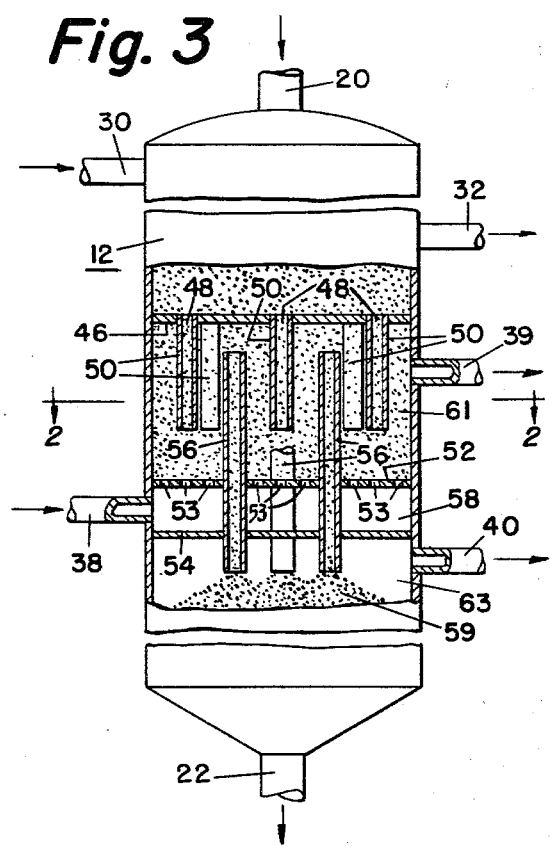
Figure 4:
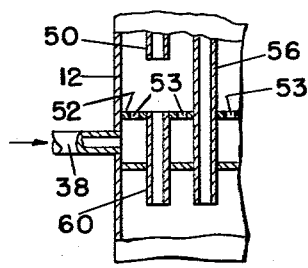
Figure 5:
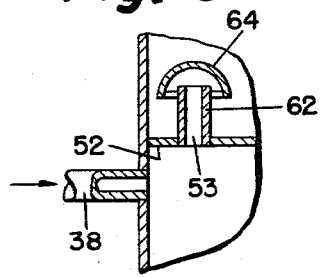

The invention will be further described with reference to the attached drawing, wherein FIGURE 1 is a schematic diagram of a catalyst circulating system of a conventional type, to which the invention is applicable, FIGURES 2 and 3 are sectional plan view and sectional elevation view respectively of one embodiment of the invention wherein a suspension and redistribution zone is provided in the regenerator, FIGURE 4 is a partial elevation view of an alternative embodiment of the invention, and FIGURE 5 is a partial elevation view of another alternative embodiment.

In FIGURE 1 a conversion vessel 10, a regeneration vessel 12, a pneumatic lift engaging vessel 14, and a pneumatic lift disengaging vessel 16 are illustrated. In operation granular solid cracking catalyst is passed downwardly by gravity through conduit 18, conversion vessel 10, conduit 20, regeneration vessel 12 and conduit 22 in series. In vessel 10 the catalyst is contacted with hydrocarbon reactants introduced through means not shown, and hydrocarbon conversion products are removed from vessel 10 through means not shown. In regeneration vessel 12, the catalyst is contacted with air introduced through means not shown, and products of oxidation of carbonaceous products are removed from vessel 12 through means not shown. Lifting gas, e.g., air, steam, etc. is introduced through line 24 into engager 14, and a suspension of regenerated catalyst in the lifting gas is passes upwardly through lift conduit 26 into disengager 16. Lifting gas is separated from the catalyst and removed through line 28, and the catalyst is passed through line 18 to begin another cycle.

It is not necessary that separate vessels 10 and 12, with connecting conduit 20, be provided. In one embodiment, the conversion zone and the regeneration zone are provided in a single vessel, with a purging zone between, in a manner known in the art, and a plurality of catalyst down-pipes, distributed over the cross section of the vessel, are employed in place of the single conduit 20 shown in FIGURE 1.

In FIGURES 2 and 3, details of the construction of regenerator 12 are shown. A transverse plate 46 is provided, having apertures 48 therein, in which the upper ends of catalyst downpipes 50 are secured. A second transverse plate 52 is provided at a lower level. The plate 52 has apertures through which the catalyst downpipes 56, as subsequently described, pass and also has additional apertures 53. In FIGURE 2 some of the apertures 53 are illustrated, and it is to be understood that other apertures 53 are also provided, distributed preferably in a uniform manner over the cross section of the vessel.

A transverse plate 54 is provided at a still lower level, this plate also having apertures through which the downpipes 56 pass, and otherwise being imperforate. The downpipes 56 have their open upper ends positioned between plate 46 and plate 52, and have their open lower ends positioned beneath plate 54. Some of the downpipes 56 are illustrated in FIGURE 2, and it is to be understood that others are provided, distributed preferably over the cross section of the vessel.

The vessel 12 has an inlet 30 for gaseous material, and an outlet 32 for gaseous material. An additional gas inlet 38 is provided communicating with a vapor chamber 58 between the perforated plate 52 and the transverse plate 54. A gas outlet 39 communicates with the space 61 between plate 46 and plate 52. A gas outlet 40 communicates with the space 63 beneath plate 54 and above the upper surface of the compact catalyst bed 59.

In operation, catalyst is introduced through line 20 into vessel 12, and is contacted therein with gas introduced through line 30. In one embodiment, this gas is air, and an initial burning of carbon from the catalyst is provided upon contact with the air. The products of combustion are withdrawn through line 32. Conventional air distribution means not shown, and conventional combustion product disengaging means not shown, are provided in conjunction with the inlet 30 and outlet 32.

The catalyst, from which a portion of the carbon thereon has been burned, is passed downwardly by gravity as a compact bed through the apertures 48 and the downpipes 50. A fluid suspending medium, e.g., air, is introduced through line 38 into chamber 58, and passes upwardly through the orifices 53 into contact with the catalyst issuing from the lower ends of the downpipes 50. The catalyst is thereupon suspended in the air and is carried upwardly toward the plate 46. An agitated mixture of catalyst and air is thereby provided in the zone 61 between plates 46 and 52, in which mixture the catalyst is free to move laterally to a much greater extent than in the case of a compact bed of catalyst moving downwardly by gravity. The lateral movement of catalyst which therefore results, causes a redistribution of catalyst particles over the cross section of the vessel.

Catalyst particles which are carried up by the suspending fluid enter the open upper ends of the downpipes 56, and pass downwardly therethrough into the bed 59. The catalyst in the bed 59 moves downwardly by gravity as a compact mass, and is subjected to further operations, of a conventional nature, not illustrated.

The fluid suspending medium is withdrawn from the space 61 between plates 46 and 52 through conduit 39, suitable baffling means not shown being provided to avoid excessive carryover of catalyst into the conduit 39. Fluid suspending medium which passes downwardly through the downpipes 56, is removed from the vessel 12 through the line 40.

During the suspending and redistributing operation described above, further combustion of carbon on the catalyst surface takes place, and the products of combustion are removed through conduits 39 and 40.

It is not essential to provide both conduits 39 and 40, and either one of these conduits can be employed without the other.

An inert fluid as nitrogen or steam can be employed instead of air as the suspending medium in the preceding operation, and if desired the catalyst in the bed 59 can then be subjected to conventional contact with air by means not shown for additional burning of carbonaceous deposits therefrom.

Where air is used as the suspending medium, and additional combustion takes place during the suspending and redistribution, conventional cooling coils or other cooling means are preferably provided in the suspension and redistribution zone, in order to prevent the development of excessively high temperatures.

In FIGURE 4, a modification is illustrated wherein additional catalyst downpipes 60, having their upper ends secured within apertures in plate 52, are provided. A plurality of such conduits is provided, distributed over the horizontal cross section of the vessel. Each of these downpipes may be positioned directly beneath the lower end of a corresponding downpipe 50, but this is not essential.

The downpipes 60 provide means for conveying catalyst downwardly through the plate 52 when fluid is not introduced through line 38. This makes alternative operations possible. If fluid is introduced through line 38, the catalyst above plate 52 is suspended and passed upwardly, and then passes downwardly through the downpipes 56. Upon shutting off the fluid supply to conduit 38, the catalyst passes downwardly through the downpipes 60 instead. Thus, the suspending and redistributing action can be limited to those periods of operation in which it is found to be necessary, and conventional operation can be employed at other times.

In FIGURE 5, an embodiment is illustrated wherein risers 62 are provided in the orifices 53, and caps 64 are provided above the risers. The suspending fluid in this embodiment passes through the riser and underneath the cap into the suspending and redistributing zone. The operation is otherwise the same as in the previous embodiment. It is to be understood that other known means for introducing fluid into a zone containing catalyst in order to suspend the catalyst can be employed.

The invention claimed is:

1. Apparatus for contacting fluid material with granular solids which comprises a vessel having an upper inlet for solids and a lower outlet for solids; a transverse plate in said vessel, said plate having passages therethrough for granular solids; a perforated transverse plate beneath the first-named transverse plate; a third transverse plate beneath said perforated transverse plate, forming a gas chamber between said third transverse plate and said perforated transverse plate; a plurality of solids downcomers having their open upper ends positioned between said first-named transverse plate and said perforated transverse plate, and extending through apertures in said perforated transverse plate and said third transverse plate, said perforated transverse plate having perforations in addition to the apertures through which the downcomers pass; a gas inlet communicating with said gas chamber; and a gas outlet communicating with said vessel at a level vertically spaced from said gas chamber; whereby gas passes upwardly through said perforated transverse plate and suspends solids issuing from the lower ends of the first-named downcomers, and the suspended solids pass downwardly through the second-named downcomers into the region beneath the third transverse plate.

2. In a process for the conversion of fluid material with granulated solids at elevated temperature wherein:
  (1) granular solids are passed downwardly through a first contacting zone as a first compact moving bed of solids,
  (2) fluid material is passed through said compact bed at elevated temperature to effect conversion of the fluid material, whereby carbonaceous materials are deposited on said solids,
  (3) said solids containing carbonaceous deposits are passed downwardly through a second contacting zone as a second compact moving bed of solids,
  (4) oxygen-containing gas is passed through said second bed at elevated temperature to burn carbonaceous materials from said solids,
  (5) the resulting solids are again passed through said first contacting zone to contact additional fluid material, and
  (6) the solids in the latter passage through the first contacting zone have uneven temperature distribution over the cross section of the zone, the improvement which comprises:
    (a) during the passage of granular solids from one of said contacting zones to the other, passing said solids downwardly into a suspending zone as a plurality of compact columns distributed over the cross section of said suspending zone;
    (b) passing suspending fluid into said suspending zone;
    (c) suspending said solids in said fluid in said suspending zone;
    (d) passing fluid containing suspended solids upwardly in said suspending zone to a level in an upper portion of said suspending zone; and
    (e) passing said solids downwardly from said upper portion of said suspending zone into a receiver beneath said suspending zone as a plurality of streams distributed over the cross section of said zone.

3. In a process for the conversion of fluid material with granular solids at elevated temperature wherein:
  (1) granular solids are passed downwardly through a first contacting zone as a first compact moving bed of solids.
  (2) fluid material is passed through said compact bed at elevated temperature to effect conversion of the fluid material, whereby carbonaceous materials are deposited on said solids, (3) said solids containing carbonaceous deposits are passed downwardly through a second contacting zone as a second compact moving bed of solids, (4) oxygen-containing gas is passed through said second bed at elevated temperature to burn carbonaceous materials from said solids, (5) the resulting solids are again passed through said first contacting zone to contact additional fluid material, and (6) the solids in the latter passage through the first contacting zone have uneven temperature distribution over the cross section of the zone, the improvement which comprises:

(a) during the passage of granular solids from one of said contacting zones to the other, passing said solids downwardly into a suspending zone as a plurality of compact columns distributed over the cross section of the zone;

(b) passing suspending fluid into a fluid zone which is beneath said suspending zone and contains only fluid;

(c) passing fluid upwardly from said fluid zone into said suspending zone as a plurality of streams distributed over the cross section of the zone;

(d) suspending said solids in said fluid in said suspending zone;

(e) passing fluid containing suspended solids upwardly in said suspending zone to a level in an upper portion of said suspending zone;

(f) passing solids downwardly from said level in a plurality of confined paths to a third contacting zone beneath said fluid zone;

(g) passing solids downwardly through said third zone as a compact bed;

(h) removing fluid from an upper portion of said suspending zone; and (i) removing additional fluid from the upper poriton of said third zone.

4. Process according to claim 3 wherein said solids are passed from said second contacting zone into said suspending zone, and said suspending fluid is air.

5. Process according to claim 3 wherein, periodically, the passage of suspended fluid into said suspending zone is terminated, and said solids pass downwardly through said suspending zone as a compact moving bed, and then pass downwardly from said suspending zone as a plurality of compact columns into said third contacting zone.

References Cited in the file of this patent

UNITED STATES PATENTS

| | | |
|---|---|---|
| 2,436,870 | Murphree | Mar. 2, 1948 |
| 2,542,887 | Watson | Feb. 20, 1951 |
| 2,664,433 | Hudson | Dec. 29, 1953 |
| 2,687,371 | Bowles | Aug. 24, 1954 |
| 2,766,186 | Nadro | Oct. 9, 1956 |
| 2,849,380 | Utterback | Aug. 26, 1958 |
| 2,913,404 | Lieffers et al. | Nov. 17, 1959 |
| 2,925,378 | Mitchell | Feb. 16, 1960 |